(12) United States Patent
Khoury et al.

(10) Patent No.: US 12,475,534 B1
(45) Date of Patent: Nov. 18, 2025

(54) FOVEATED ANTI-ALIASING

(71) Applicant: Apple Inc., Cupertino, CA (US)

(72) Inventors: Jad-Nicolas Khoury, San Francisco, CA (US); Michael J. Rockwell, Palo Alto, CA (US); Seyedkoosha Mirhosseini, Santa Clara, CA (US); Yashas Rai Kurlethimar, San Jose, CA (US)

(73) Assignee: APPLE INC., Cupertino, CA (US)

( * ) Notice: Subject to any disclaimer, the term of this patent is extended or adjusted under 35 U.S.C. 154(b) by 322 days.

(21) Appl. No.: 18/244,480

(22) Filed: Sep. 11, 2023

Related U.S. Application Data

(60) Provisional application No. 63/407,268, filed on Sep. 16, 2022.

(51) Int. Cl.
*G06T 5/50* (2006.01)
*G06T 5/80* (2024.01)

(52) U.S. Cl.
CPC .................. *G06T 5/50* (2013.01); *G06T 5/80* (2024.01); *G06T 2207/30041* (2013.01)

(58) Field of Classification Search
None
See application file for complete search history.

(56) References Cited

U.S. PATENT DOCUMENTS

2018/0060688 A1* 3/2018 Worthington ............. G06T 3/18
2019/0236834 A1* 8/2019 Blackmon ................ G06F 3/013
(Continued)

FOREIGN PATENT DOCUMENTS

WO  WO-2019217260 A1 * 11/2019 ......... G02B 27/0101

OTHER PUBLICATIONS

"Efficient Peripheral Flicker Reduction for Foveated Rendering in Mobile VR Systems"; Haomiao Jiang et al.; IEEE Conference on Virtual Reality and 3D User Interfaces Abstracts and Workshops; pp. 802-803; 2020. (Year: 2020).*

*Primary Examiner* — David Ometz
(74) *Attorney, Agent, or Firm* — Fernando & Partners, LLP

(57) ABSTRACT

In one implementation, a method of generating an output image is performed by a device including a display, one or more processors, and non-transitory memory. The method includes obtaining a currently rendered image. The method includes obtaining an accumulation image based on previously rendered images. The method includes generating an output image based on the currently rendered image and the accumulation image, wherein the output image includes: (1) a first output pixel at a first pixel location associated with a first resolution greater than or equal to a threshold, the first output pixel having a first output pixel value that is a currently rendered image pixel value of a currently rendered image pixel at the first pixel location; (2) a second output pixel at a second pixel location associated with a second resolution less than the threshold, the second output pixel having a second output pixel value that is a weighted sum of a currently rendered image pixel value of a currently rendered image pixel at the second pixel location and an accumulation image pixel value of an accumulation image pixel at a corresponding pixel location corresponding to the second pixel location; and (3) a third output pixel at a third pixel location associated with a third resolution less than the threshold, the third output pixel having a third output pixel value that is a currently rendered image pixel value of a currently rendered image pixel at the third pixel location. The method includes displaying, on the display, the output image.

20 Claims, 12 Drawing Sheets

(56) References Cited

U.S. PATENT DOCUMENTS

2021/0278678 A1\* 9/2021 Brannan ................... G06T 3/40
2024/0233220 A1\* 7/2024 Khoury ................... G06T 11/40

\* cited by examiner

400A

At a device including a display, one or more processors and non-transitory memory:

For each pixel in the accumulation region, mapping a pixel location from the warped currently rendered image space to an unwarped version of the currently rendered image space — 410A For each pixel in the accumulation region, reprojecting the pixel location in unwarped version of the currently rendered image space to a pixel location in the unwarped version of the accumulation image space. — 420A For each pixel in the accumulation region, mapping the pixel location in the unwarped version of the accumulation image space to the warped accumulation image space — 430A

At a device including a display, one or more processors and non-transitory memory:

For each vertex of each tile having a pixel in the accumulation region, mapping a pixel location from the warped currently rendered image space to an unwarped version of the currently rendered image space ——410B For each vertex of each tile having a pixel in the accumulation region, reprojecting the pixel location in unwarped version of the currently rendered image space to a pixel location in the unwarped version of the accumulation image space. ——420B For each pixel in the accumulation region, determine the barycentric coordinates of the pixel ——430B For each pixel in the accumulation region, determining a pixel location in the unwarped version of the accumulation image space based on the barycentric coordiantes and the pixel locations in the unwarped version of the accumulation image space of each vertex of the tile including the pixel. ——440B For each pixel in the accumulation region, adding a depth component to the pixel location in the unwarped version of the accumulation image space to generate a depth-compensated pixel location in the unwarped version of the accumulation image space ——450B For each pixel in the accumulation region, mapping the depth-compensated pixel location in the unwarped version of the accumulation image space to the warped accumulation image space. ——460B

Figure 4B

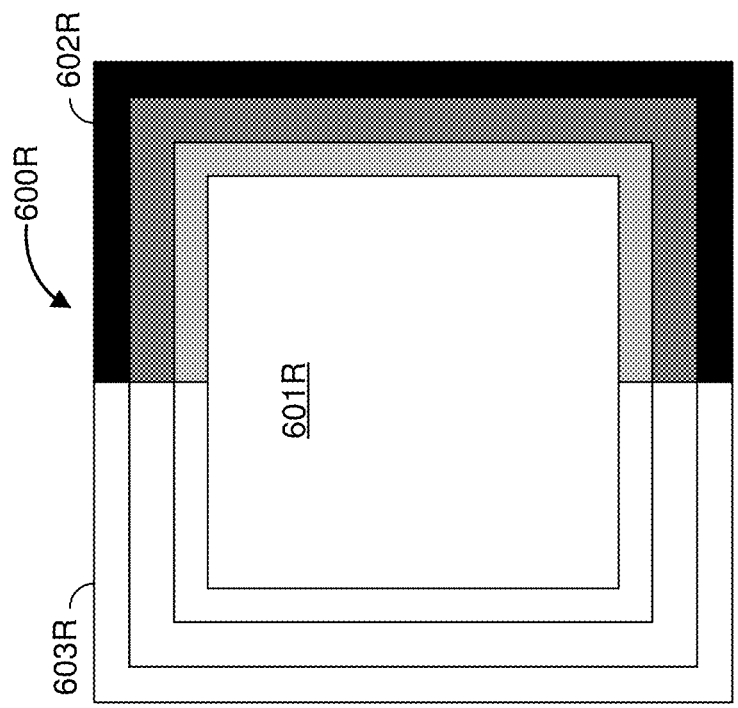
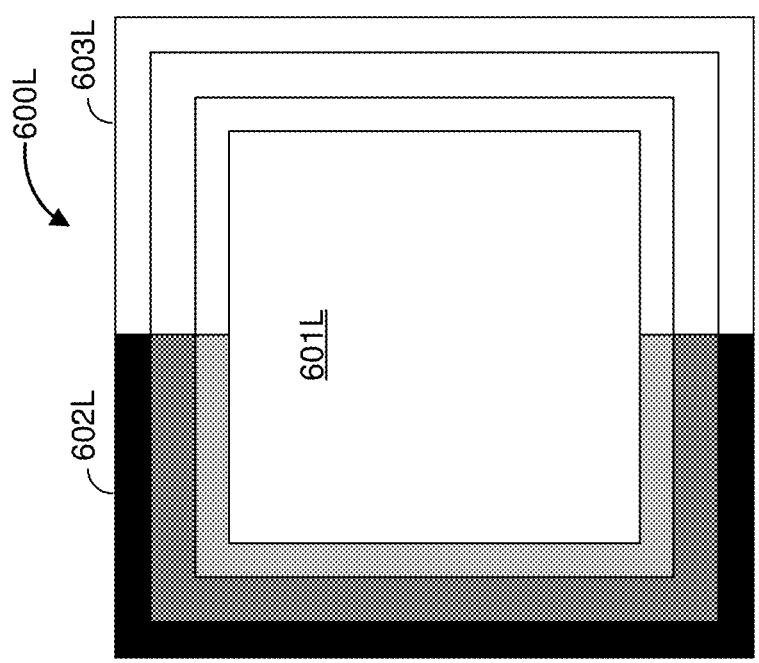
Figure 6

800

At a device including a display, one or more processors and non-transitory memory:

Obtaining a currently rendered image ⎯810

Obtaining an accumulation image based on previously rendered images ⎯820

Generating an output image based on the currently rendered image and the accumulation image, wherein the output image includes: ⎯830
(1) a first output pixel at a first pixel location associated with a first resolution greater than or equal to a threshold, the first output pixel having a first output pixel value that is a currently rendered image pixel value of a currently rendered image pixel at the first pixel location;
(2) a second output pixel at a second pixel location associated with a second resolution less than the threshold, the second output pixel having a second output pixel value that is a weighted sum of a currently rendered image pixel value of a currently rendered image pixel at the second pixel location and an accumulation image pixel value of an accumulation pixel at a corresponding pixel location corresponding to the second location; and
(3) a third output pixel at a third pixel location associated with a third resolution less than the threshold, the third output pixel having a third output pixel value that is a currently rendered image pixel value of a currently rendered image pixel at the third pixel location Displaying, on the display, the output image ⎯840

Figure 8

FOVEATED ANTI-ALIASING

CROSS-REFERENCE TO RELATED APPLICATIONS

This application claims priority to U.S. Provisional Patent App. No. 63/407,268, filed on Sep. 16, 2022, which is hereby incorporated by reference in its entirety.

TECHNICAL FIELD

The present disclosure generally relates to systems, methods, and devices for reducing aliasing in a foveated image stream.

BACKGROUND

Foveated imaging is a digital image processing technique that takes advantage of the fact that humans typically have relatively weak peripheral vision. Accordingly, different portions of an image are rendered on a display panel with different resolutions. For example, in various implementations, portions corresponding to a user's fovea are rendered with higher resolution than portions corresponding to a user's periphery. In various implementations, displaying a stream of foveated images, e.g., foveated video, causes flickering to occur in the periphery due to temporal aliasing. Whereas humans typically have relatively weak peripheral vision, such flickering is particularly noticeable and degrades the user experience.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4A illustrates a flowchart representation of a per-pixel method of determining a source pixel location.

FIG. 4B illustrates a flowchart representation of a per-tile method of determining a source pixel location.

FIGS. 5-7 illustrate various accumulation factor maps.

FIG. 8 illustrates a flowchart representation of a method of generating an output image based on an accumulation image in accordance with some implementations.

Figure 1:
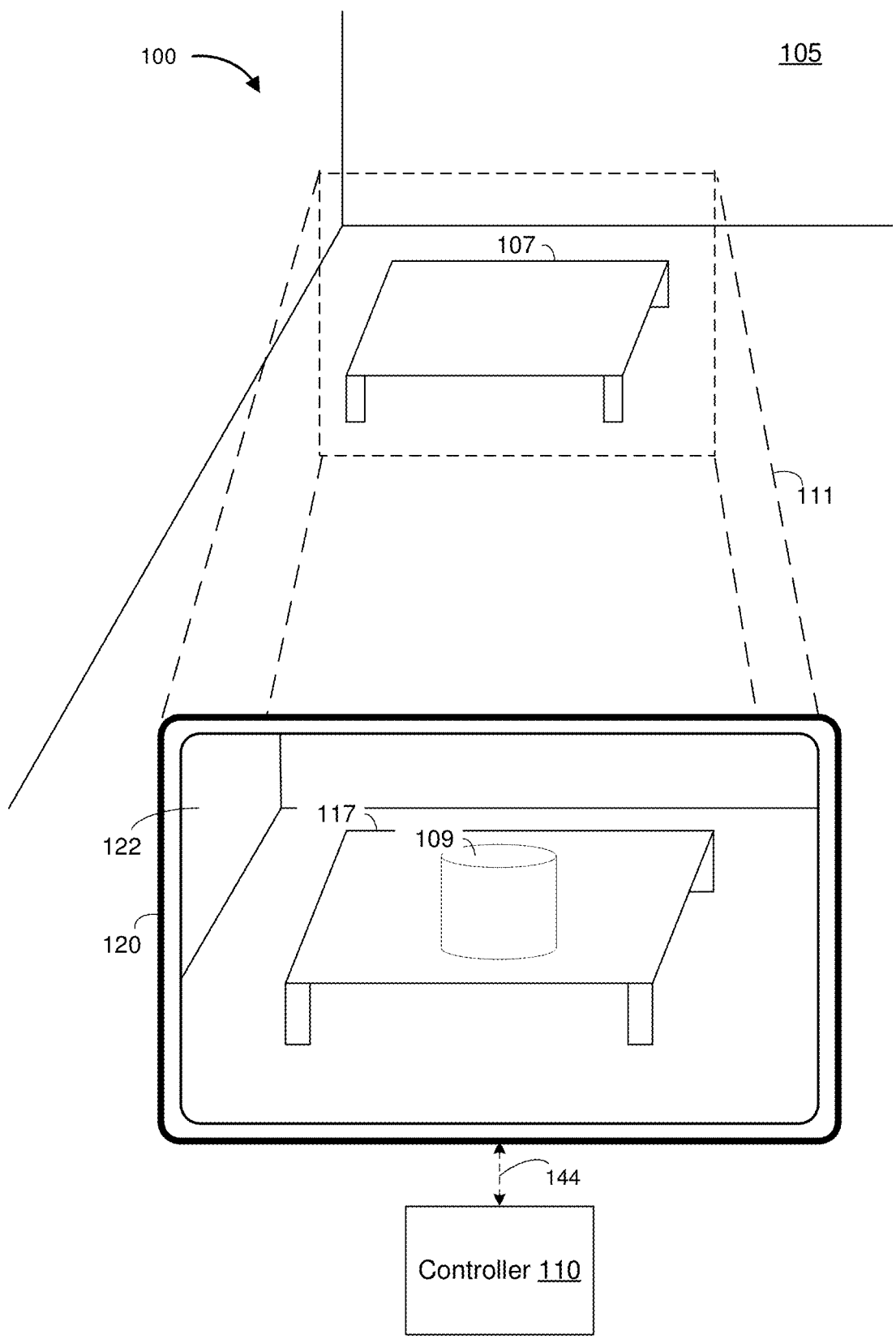
FIG. 1 illustrates a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating an output image based on two different weightings in two different regions. In various implementations, the method is performed by a device including a display, one or more processors, and non-transitory memory. The method includes obtaining a currently rendered image. The method includes obtaining an accumulation image based on previously rendered images. The method includes generating an output image based on the currently rendered image and the accumulation image, wherein the output image includes: (1) a first output pixel at a first pixel location associated with a first resolution greater than or equal to a threshold, the first output pixel having a first output pixel value that is a currently rendered image pixel value of a currently rendered image pixel at the first pixel location; (2) a second output pixel at a second pixel location associated with a second resolution less than the threshold, the second output pixel having a second output pixel value that is a weighted sum of a currently rendered image pixel value of a currently rendered image pixel at the second pixel location and an accumulation image pixel value of an accumulation image pixel at a corresponding pixel location corresponding to the second pixel location; and (3) a third output pixel at a third pixel location associated with a third resolution less than the threshold, the third output pixel having a third output pixel value that is a currently rendered image pixel value of a currently rendered image pixel at the third pixel location. The method includes displaying, on the display, the output image.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, in various implementations displaying a stream of foveated images, e.g., foveated video, causes flickering to occur in the periphery due to temporal aliasing. Whereas humans typically have relatively weak peripheral vision, such flickering is particularly noticeable and degrades the user experience. Accordingly, in various implementations, at least a portion of the periphery of a currently rendered image is blended with an accumulation image based on previously rendered images.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 9. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 10.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
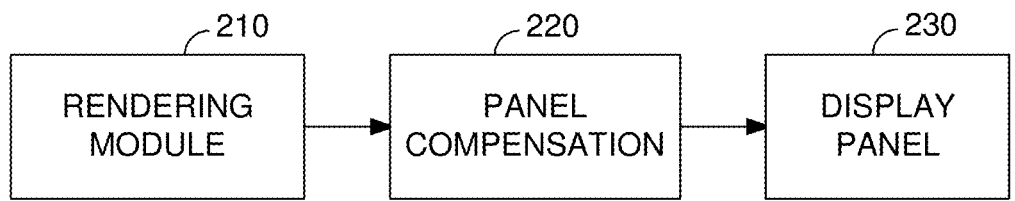
FIG. 2 illustrates a block diagram of a display pipeline in accordance with some implementations.

FIG. 2 illustrates a block diagram of a display pipeline 200 in accordance with some implementations. The display pipeline 200 includes a rendering module 210 which generates image data, a panel compensation module 220 which converts the image data into panel data, and a display panel 230 which displays an image by emitting light from each of a plurality of pixels as described by (e.g., according to) the panel data.

In various implementations, the display panel 230 includes a matrix of M×N pixels located at respective locations in a display space. In various implementations, in order to render an image for display on a display panel, the rendering module 210 generates M×N pixel values for each pixel of an M×N image. Thus, each pixel of the rendered image corresponds to a pixel of the display panel with a corresponding location in the display space. Thus, the rendering module 210 generates a pixel value for M×N pixel locations uniformly spaced in a grid pattern in the display space.

Rendering M×N pixel values can be computationally expensive. In various implementations, in order to decrease the size of the rendered image without degrading the user experience, foveation (e.g., foveated imaging) is used. Foveation is a digital image processing technique in which the image resolution, or amount of detail, varies across an image. Thus, a foveated image has different resolutions at different parts of the image. Humans typically have relatively weak peripheral vision. According to one model, resolvable resolution for a user is maximum over the fovea (e.g., where the user is gazing) and falls off in an inverse linear fashion in the periphery. Accordingly, in one implementation, the image displayed by the display panel 230 is a foveated image having a maximum resolution in the fovea and a resolution in the periphery that decreases in an inverse linear fashion in proportion to the distance from the fovea.

Because some portions of the image have a lower resolution, an M×N foveated image includes less information than an M×N unfoveated image. Thus, in various implementations, the rendering module 210 generates, as a rendered image, a foveated image. The rendering module 210 can generate an M×N foveated image more quickly and with less processing power (and battery power) than the rendering module 210 can generate an M×N unfoveated image. Also, an M×N foveated image can be expressed with less data than an M×N unfoveated image. In other words, an M×N foveated image file is smaller in size than an M×N unfoveated image file. In various implementations, compressing an M×N foveated image using various compression techniques results in fewer bits than compressing an M×N unfoveated image.

A foveation ratio, F, can be defined as the amount of information in the M×N unfoveated image divided by the amount of information in the M×N foveated image. In various implementations, the foveation ratio is between 1.5 and 10. For example, in some implementations, the foveation ratio is 2. In some implementations, the foveation ratio is 3 or 4. In some implementations, the foveation ratio is constant among images. In some implementations, the foveation ratio is determined for the image being rendered.

In some implementations, in order to render an image for display on the display panel 230, the rendering module 210 generates $M/F_h \times N/F_v$ pixel values for an $M/F_h \times N/F_v$ warped image, where $F_h$ is a horizontal scaling factor and Fr is a vertical scaling factor. Each pixel of the warped image corresponds to an area greater than a pixel of the display panel 230 at a corresponding location in the display space. Thus, the rendering module 210 generates a pixel value for each of $M/F_h \times N/F_v$ locations in the display space that are not uniformly distributed in a grid pattern. The respective area in the display space corresponding to each pixel value is defined by a respective corresponding location in the display space (a rendering location) and a respective scaling factor indicating a size of the respective area. In various implementations, each respective scaling factor is a scaling factor couple including a horizontal scaling factor indicating the width of the respective area in the display space and a vertical scaling factor indicating the height of the respective area in the display space. In various implementations, the respective scaling factors for each pixel can be represented as an $M/F_h \times N/F_v$ matrix referred to as a scaling factor map. In various implementations, each tile of pixels of size T×T has a respective scaling factor. Thus, in various implementations, the respective scaling factors for each pixel can be represented as an $M/(F_vT) \times N/(F_hT)$ matrix referred to as a sparse scaling factor map. As the scaling factor increases, the resolution at the rendering location decreases. In various implementations, the resolution at the rendering location is inversely proportional to the scaling factor. Accordingly, in various implementations, a resolution (or a resolution map) rather than a scaling factor (or scaling factor map) is used in various image processing algorithms described herein.

In various implementations, the rendering module 210 generates, as a rendered image, a warped image. In various implementations, the warped image includes a matrix of $M/F_h \times N/F_v$ pixel values for $M/F_h \times N/F_v$ locations uniformly spaced in a grid pattern in a warped space that is different than the display space. Particularly, the warped image includes a matrix of $M/F_h \times N/F_v$ pixel values for $M/F_h \times N/F_v$ locations in the display space that are not uniformly distributed in a grid pattern. Thus, whereas the resolution of the warped image is uniform in the warped space, the resolution varies in the display space.

Figure 3B:
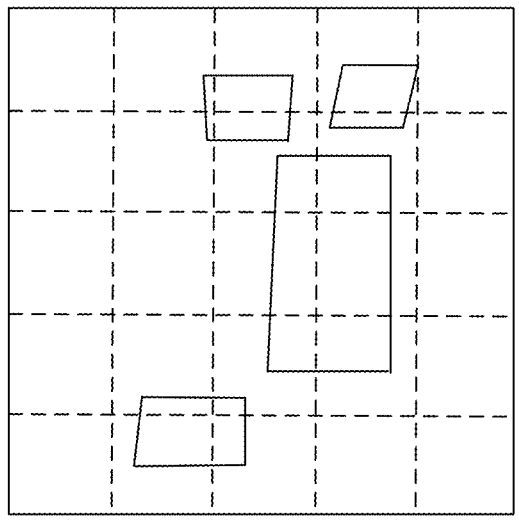
FIG. 3B illustrates a warped image of the XR content of FIG. 3A.
Figure 3A:
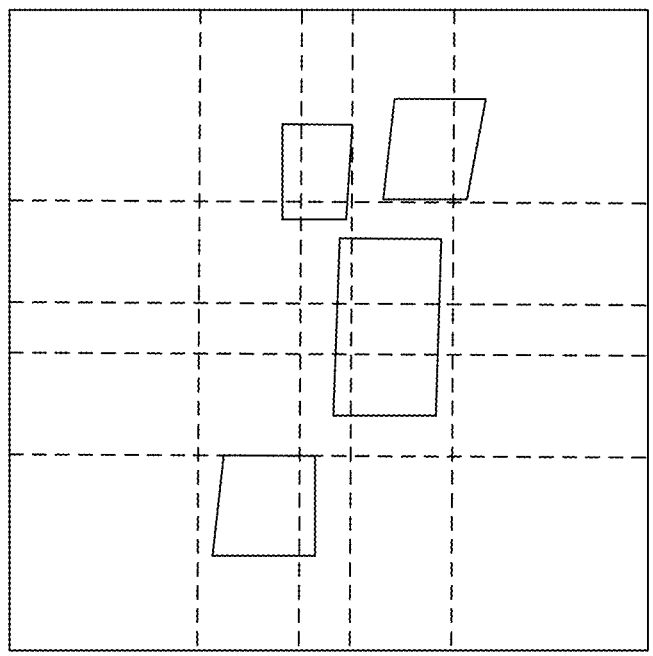
FIG. 3A illustrates an unfoveated image of XR content to be displayed in a display space.

FIG. 3A illustrates an unfoveated image 310 of XR content to be displayed in a display space. FIG. 3B illustrates a warped image 320 of the XR content. Different parts of the XR content in the unfoveated image 310 corresponding to different amounts of area in the display space are rendered into the same amount of area in the warped image 320. For example, the area at the center of the unfoveated image 310 of FIG. 3A is represented by an area in the warped image 320 of FIG. 3B including K pixels (with K pixel values). Similarly, the area on the corner of the unfoveated image 310 of FIG. 3A (a larger area than the area at the center of FIG. 3A) is also represented by an area in the warped image 320 of FIG. 3B including K pixels (with K pixel values).

The panel compensation module 220 converts the image data into panel data. In various implementations, the panel compensation module 220 converts a warped image into a foveated image. For example, in various implementations, the panel compensation module 220 converts an M/F×N/F warped image into an M×N foveated image based on the scaling factor map. As noted above, the display panel 220 displays an image based on the panel data.

In various implementations, displaying a stream of foveated images, e.g., foveated video, causes flickering to occur in the periphery due to temporal aliasing. Whereas humans typically have relatively weak peripheral vision, such flickering is particularly noticeable and degrades the user experience. Accordingly, in various implementations, to reduce flickering, the rendering module 210 generates an output image that, at least in a portion of the periphery referred to as an accumulation region, is a weighted sum of (1) a currently rendered image and (2) an accumulation image based on previously rendered images. Further, when the output image is a warped image, the weighting at each pixel in the accumulation region is based on the respective scaling factor of the pixel.

In various implementations, at a rendering time, t, the rendering module 210 renders a rendered image, Rr, having a rendered image pixel at a location $(x_t, y_t)$ in the accumulation region of the image space with a rendered pixel value of $R_t(x_t,y_t)$. Further, the rendering module 210 stores an accumulation image, $A_t$, having an accumulation image pixel at the location $(x_t, y_t)$ with an accumulation image pixel value of $A_t(x_t,y_t)$. Based on the rendered image and the accumulation image, the rendering module 210 generates an output image, $O_t$, having an output image pixel at the location $(x_t,y_t)$ with an output image pixel value of $O_t(x_t,y_t)$. In various implementations, the output image pixel value in the accumulation region is a weighted sum of the rendered image pixel value and the accumulation image pixel value. Thus, $O_t(x_t,y_t)=(1-\alpha)R_t(x_t,y_t)+\alpha A_t(x_t,y_t)$, where $\alpha$ is a weighting factor, also referred to as an accumulation factor, and $(1-\alpha)$ is another weighting factor, also referred to as a blending factor. In various implementations, the output image pixel value at pixel locations outside the accumulation region is the same as the rendered image pixel value the pixel locations, equivalent to setting the weighting factor, $\alpha$, to 0.

Further, the rendering module 210 updates the accumulation image for the next rendering time, t+1, as the output image. Thus, $A_{t+1}=O_t$.

In various implementations, the perspective of the rendered image changes between rendering times. For example, in various implementations, a user of an electronic device displaying an XR environment moves the electronic device between rendering times. Failing to consider the change in perspective results, in various implementations, in a weighted sum of a rendered image from a first perspective with an accumulation image from a second perspective producing ghosting, smearing, or other undesirable artifacts.

In various implementations, the accumulation image lies in the same image space as the previously rendered image. We can therefore consider the accumulation image space and the previously rendered image space to be the same. A projective transform is used to determine the source pixel in the accumulation image that corresponds to a particular pixel in the rendered image.

In various implementations, the projective transformation is a backward mapping in which, for a pixel of the currently rendered image at a pixel location in a currently rendered image space, a source pixel location is determined in an accumulation image space of the accumulation image.

FIG. 4A is a flowchart representation of a per-pixel method 400A of determining source pixel locations in accordance with some implementations. In various implementations, the method 400A is performed by a device with one or more processors and non-transitory memory (e.g., the electronic device 120 of FIG. 1). In some implementations, the method 400A is performed by processing logic, including hardware, firmware, software, or a combination thereof. In some implementations, the method 400A is performed by a processor executing instructions (e.g., code) stored in a non-transitory computer-readable medium (e.g., a memory). In various implementations, the method 400A is performed by a compute shader.

The method 400A begins, in block 410A, with the device, for each pixel in the accumulation region, mapping a pixel location from the warped currently rendered image space to an unwarped version of the currently rendered image space. A mapping, based on the scaling factor map of the currently rendered image, $S_t$, exists from the pixel location in the warped currently rendered image space $(x_t, y_t)$ to the pixel location in the unwarped version of the currently rendered image space $(x'_t, y'_t)$. Thus, for some mapping M, $(x'_t, y'_t) = M(x_t, y_t, S_t)$.

The method 400A continues, in block 420A, with the device, for each pixel in the accumulation region, reprojecting the pixel location in the unwarped version of the currently rendered image to a pixel location in the unwarped version of the accumulation image space. In various implementations, the pixel location in the unwarped version of the accumulation image space is determined according to the following equation in which $P_t$ is a 4×4 view projection matrix representing the perspective of the currently rendered image, $P_{t-1}$ is a 4×4 view projection matrix representing the perspective of the previously rendered image (and the accumulation image), z is the depth map for the currently rendered image, $z_{t-1}$ is a transformed depth, and w is a perspective scaling factor:

$$w \cdot \begin{bmatrix} x'_{t-1} \\ y'_{t-1} \\ z_{t-1} \\ 1 \end{bmatrix} = P_{t-1} \cdot P_t^{-1} \cdot \begin{bmatrix} x'_t \\ y'_t \\ z(x_t, y_t) \\ 1 \end{bmatrix}$$

The multiplication of $P_{t-1}$ and $P_t^{-1}$ is a 4×4 transformation matrix, $T_t$, with elements $T_n$ for n between 1 and 16. In various implementations, the pixel location in the unwarped version of the accumulation image space is determined as:

$$w \cdot \begin{bmatrix} x'_{t-1} \\ y'_{t-1} \\ z_{t-1} \\ 1 \end{bmatrix} = T_t \cdot \begin{bmatrix} x'_t \\ y'_t \\ z(x_t, y_t) \\ 1 \end{bmatrix} = \begin{bmatrix} T_1 & T_2 & T_3 & T_4 \\ T_5 & T_6 & T_7 & T_8 \\ T_9 & T_{10} & T_{11} & T_{12} \\ T_{13} & T_{14} & T_{15} & T_{16} \end{bmatrix} \cdot \begin{bmatrix} x'_t \\ y'_t \\ z(x_t, y_t) \\ 1 \end{bmatrix} = \begin{bmatrix} T_1 x'_t + T_2 y'_t + T_3 d(x_t, y_t) + T_4 \\ T_5 x'_t + T_6 y'_t + T_7 d(x_t, y_t) + T_8 \\ T_9 x'_t + T_{10} y'_t + T_{11} d(x_t, y_t) + T_{12} \\ T_{13} x'_t + T_{14} y'_t + T_{15} d(x_t, y_t) + T_{16} \end{bmatrix}$$

The method 400A continues, in block 430A, with the device, for each pixel in the accumulation region, mapping the pixel location in the unwarped version of the accumulation image space to the warped accumulation image space. An inverse mapping, based on the scaling factor map of the accumulation image, $S_{t-1}$, exists from the pixel location in the unwarped version of the accumulation image space $(x'_{t-1}, y'_{t-1})$ to the pixel location in the warped accumulation image space $(x_{t-1}, y_{t-1})$. Thus, $(x_{t-1}, y_{t-1}) = M^{-1}(x'_{t-1}, y'_{t-1}, S_{t-1})$.

To reduce the amount of processing to determine source pixel locations, in various implementations, certain operations are performed on a per-tile basis, whereas others are performed on a per-pixel basis. For example, by performing the reprojection on a per-tile basis, significant computational savings are realized.

FIG. 4B is a flowchart representation of a per-tile method 400B of determining a source pixel location in accordance with some implementations. In various implementations, the method 400B is performed by a device with one or more processors and non-transitory memory (e.g., the electronic device 120 of FIG. 1). In some implementations, the method 400B is performed by processing logic, including hardware, firmware, software, or a combination thereof. In some implementations, the method 400B is performed by a processor executing instructions (e.g., code) stored in a non-transitory computer-readable medium (e.g., a memory). In various implementations, the method 400B is performed by a vertex shader and fragment shader.

The currently rendered image is partitioned into tiles. For example, in various implementations, the currently rendered image is partitioned into a grid with one cell per tile. Thus, in various implementations, the tiles are rectangular. In various implementations, the tiles are triangular. Each tile is defined by vertices at the corners of the tile.

The method 400B begins, in block 410B, with the device, for each vertex of each tile having a pixel in the accumulation region, mapping a pixel location from the warped currently rendered image space to an unwarped version of the currently rendered image space. A mapping, based on the scaling factor map of the currently rendered image, $S_t$, exists from the pixel location in the warped currently rendered image space $(x_t, y_t)$ to the pixel location in the unwarped version of the currently rendered image space $(x'_t, y'_t)$. Thus, for some mapping M, $(x'_t, y'_t) = M(x_t, y_t, S_t)$.

The method 400B continues, in block 420B, with the device, for each vertex of each tile having a pixel in the accumulation region, reprojecting the pixel location in the unwarped version of the currently rendered image space to a pixel location in the unwarped version of the accumulation image space. In various implementations, the pixel location in the unwarped version of the accumulation image space is determined using homogenous coordinates according to the following equation in which $P_t$ is a 4×4 view projection matrix representing the perspective of the currently rendered image, $P_{t-1}$ is a 4×4 view projection matrix representing the perspective of the previously rendered image (and the accumulation image), z is the depth map for the currently rendered image, $z_{t-1}$ is a transformed depth, and w is a perspective scaling factor:

$$w \cdot \begin{bmatrix} x'_{t-1} \\ y'_{t-1} \\ z_{t-1} \\ 1 \end{bmatrix} = P_{t-1} \cdot P_t^{-1} \cdot \begin{bmatrix} x'_t \\ y'_t \\ 0 \\ 1 \end{bmatrix}$$

The multiplication of $P_{t-1}$ and $P_t^{-1}$ is a 4×4 transformation matrix, $T_t$, with elements $T_n$ for n between 1 and 16. In various implementations, the pixel location in the unwarped version of the accumulation image space is determined as:

$$w \cdot \begin{bmatrix} x'_{t-1} \\ y'_{t-1} \\ z_{t-1} \\ 1 \end{bmatrix} = T_t \cdot \begin{bmatrix} x'_t \\ y'_t \\ z(x_t, y_t) \\ 1 \end{bmatrix} = \begin{bmatrix} T_1 & T_2 & T_3 & T_4 \\ T_5 & T_6 & T_7 & T_8 \\ T_9 & T_{10} & T_{11} & T_{12} \\ T_{13} & T_{14} & T_{15} & T_{16} \end{bmatrix} \cdot \begin{bmatrix} x'_t \\ y'_t \\ 0 \\ 1 \end{bmatrix} =$$

-continued $$\begin{bmatrix} T_1 x'_t + T_2 y'_t + T_4 \\ T_5 x'_t + T_6 y'_t + T_8 \\ T_9 x'_t + T_{10} y'_t + T_{12} \\ T_{13} x'_t + T_{14} y'_t + T_{16} \end{bmatrix}$$

The method 400B continues, in block 430B, with the device, for each pixel in the accumulation region, determining barycentric coordinates of the pixel. For example, for a pixel at a pixel location in the warped currently rendered image space $(x_t, y_t)$ in a tile having three vertices at pixel locations in the warped currently rendered image space of $(x_{v1}, y_{v1})$, $(x_{v2}, y_{v2})$, and $(x_{v3}, y_{v3})$, barycentric coordinates $(\lambda_1, \lambda_2, \lambda_3)$ are determined as follows:

$$\begin{bmatrix} x_t \\ y_t \end{bmatrix} = \lambda_1 \begin{bmatrix} x_{v1} \\ y_{v1} \end{bmatrix} + \lambda_2 \begin{bmatrix} x_{v2} \\ y_{v2} \end{bmatrix} + \lambda_3 \begin{bmatrix} x_{v3} \\ y_{v3} \end{bmatrix}$$

The method 400B continues, in block 440B, with the device, for each pixel in the accumulation region, determining a pixel location in the unwarped version of the accumulation image space based on the barycentric coordinates (determined in block 430B) and the pixel locations in the unwarped version of the accumulation image space of each vertex (determined in block 420B) of the tile including the pixel. For example, for a pixel at a pixel location in the warped currently rendered image (x,y) in a tile having three vertices at pixel locations in the unwarped version of the accumulation image space image of $(x'_{v1}, y_{v1})$, $(x'_{v2}, y_{v2})$, and $(x'_{v3}, y'_{v3})$, the pixel location in the unwarped version of the accumulation image space $(x'_{t-1}, y'_{t-1})$ is determined as follows:

$$\begin{bmatrix} x'_{t-1} \\ y'_{t-1} \end{bmatrix} = \lambda_1 \begin{bmatrix} x'_{v1} \\ y'_{v1} \end{bmatrix} + \lambda_2 \begin{bmatrix} x'_{v2} \\ y'_{v2} \end{bmatrix} + \lambda_3 \begin{bmatrix} x'_{v3} \\ y'_{v3} \end{bmatrix}$$

The method 400B continues, in block 450B, with the device, for each pixel in the accumulation region, adding a depth component to the pixel location in the unwarped version of the accumulation image space to generate a depth-compensated pixel location in the unwarped version of the accumulation image space. For example, in various implementations, for a pixel having a pixel location in the unwarped version of the accumulation image space $(x'_{t-1}, y'_{t-1})$, a depth-compensated pixel location in the unwarped version of the accumulation image space $(x'_{t-1,d}, y'_{t-1,d})$ is determined as follows:

$$w \cdot \begin{bmatrix} x'_{t-1,d} \\ y'_{t-1,d} \\ z'_{t-1,d} \\ 1 \end{bmatrix} = \begin{bmatrix} x'_{t-1} \\ y'_{t-1} \\ 0 \\ 0 \end{bmatrix} + z(x_t, y_t) \cdot \begin{bmatrix} T_3 \\ T_7 \\ T_{11} \\ T_{15} \end{bmatrix}$$

The method 400B continues, in block 460B, with the device, for each pixel in the accumulation region, mapping the depth-compensated pixel location in the unwarped version of the accumulation image space to the warped accumulation image space. An inverse mapping, based on the scaling factor map of the accumulation image, $S_{t-1}$, exists from the pixel location in the unwarped version of the accumulation image space $(x'_{t-1,d}, y'_{t-1,d})$ to the pixel location in the warped accumulation image space $(x_{t-1}, y_{t-1})$. Thus, $(x_{t-1}, y_{t-1}) = M^{-1}(x'_{t-1,d}, y'_{t-1,d}, S_{t-1})$.

In various implementations, the operations of block 410B, block 420B, and block 430B are performed by a vertex shader and the operations of block 450B and block 460B are performed by a fragment shader.

In various implementations, the output image pixel value of a pixel in the accumulation region is a weighted sum of the rendered image pixel value and the accumulation image pixel value. Thus, $O_t(x_t, y_t) = (1-\alpha) R_t(x_t, y_t) + \alpha A_t(x_t, y_t)$.

However, as illustrated above, the source pixel position in the accumulation image space $(x_{t-1}, y_{t-1})$ might be different from the pixel position in the currently rendered image $(x_t, y_t)$. Thus, the accumulation pixel value $A_t(x_t, y_t) = A_t(x_{t-1}, y_{t-1})$. Accordingly, in various implementations, $O_t(x_t, y_t) = (1-\alpha) R_t(x_t, y_t) + \alpha A_t(x_{t-1}, y_{t-1})$. In various implementations, the location $(x_{t-1}, y_{t-1})$ may be between existing pixels of the accumulation image, and the pixel value $A_t(x_{t-1}, y_{t-1})$ is determined using interpolation or other techniques.

In various implementations, before being added to the rendered image, the accumulation image is improved with filtering, color-correction, anti-ghosting, or other processing. Accordingly, in various implementations, a function, G, is performed on the accumulation image, $A_t$, to generate a blending image, $B_t$. In various implementations, the output image pixel value of a pixel in the accumulation region is a weighted sum of the rendered image pixel value and the blending image pixel value. Thus, $O_t(x_t, y_t) = (1-\alpha) R_t(x_t, y_t) + \alpha B_t(x_{t-1}, y_{t-1})$. Further, $O_t(x_t, y_t) = (1-\alpha) R_t(x_t, y_t) + \alpha G(A_t(x_{t-1}, y_{t-1}))$. Thus, in various implementations, the output pixel value of a pixel in the accumulation region is a weighted sum of the rendered pixel value at a first location and a function of the accumulation image pixel value at a second location corresponding to the first location via a projective transform.

In various implementations, the weighting factor, $\alpha$, is a function of the scaling factor at the pixel location. Thus, $O_t(x_t, y_t) = (1-\alpha(S_t(x_t, y_t)) R_t(x_t, y_t) + \alpha(S_t(x_t, y_t)) G(A_t(x_{t-1}, y_{t-1}))$. In particular, in various implementations, the weighting factor, $\alpha$, is a function of the horizontal scaling factor at the pixel location, $S^x_t(x_t, y_t)$, and the vertical scaling factor at the pixel location, $S^y_t(x_t, y_t)$. For example, in various implementations, the weighting factor, $\alpha$, is a function of the lesser of the inverse of the horizontal scaling factor at the pixel location, $S^x_t(x_t, y_t)$, and the inverse of the vertical scaling factor at the pixel location, $S^y_t(x_t, y_t)$, denoted $r_{min}(x_t, y_t)$. Thus, in various implementations, $$\alpha = f\left(\min\left(\frac{1}{S^x_t(x_t, y_t)}, \frac{1}{S^x_t(x_t, y_t)}\right)\right) = f(r_{min}(x_t, y_t)).$$

In various implementations, the function, $f$, is a decreasing function of $r_{min}(x_t, y_t)$. In various implementations, the function, $f$, is a linear or piecewise linear function of $r_{min}(x_t, y_t)$.

In various implementations, the weighting factor, $\alpha$, is lower in the fovea than in the periphery. In various implementations, the weighting factor, $\alpha$, is 0 in the fovea, resulting in a bypass of the weighted averaging. In various implementations, a fovea threshold, $\tau$, is defined as the largest scaling factor (or smallest resolution) at which a pixel is considered to be in the fovea.

Figure 4C:
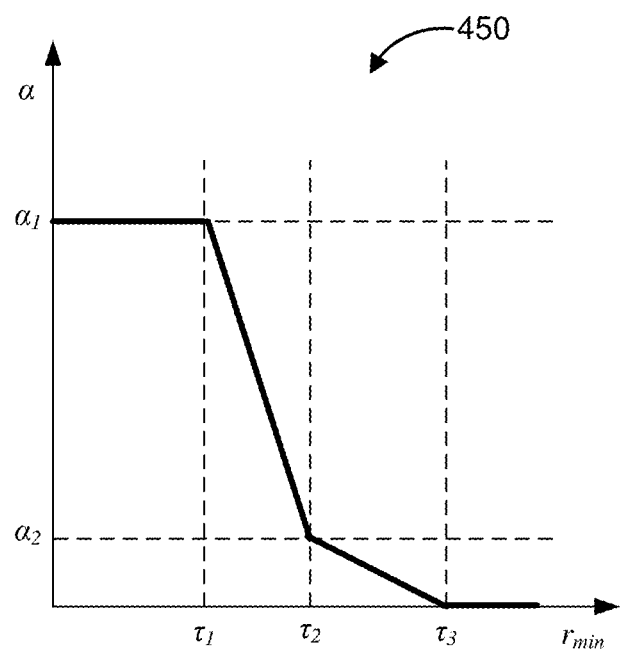
FIG. 4C illustrates a plot of an accumulation factor function.

FIG. 4C illustrates a plot 450 of an accumulation factor function. The accumulation factor function is a first value, $\alpha_1$, for $r_{min}$ between 0 and a first threshold, $\tau_1$. The accumulation factor function linearly decreases with a first slope from the first value, $\alpha_1$, to a second value, $\alpha_2$, for $r_{min}$ between the first threshold, $\tau_1$, and a second threshold, $\tau_2$. The accumulation factor function linearly decreases with a second slope from the second value, $\alpha_2$, to 0, for $r_{min}$ between the second threshold, $\tau_2$, and a third threshold, $\tau_3$. The accumulation factor function is 0 for $r_{min}$ greater than the third threshold, $\tau_3$ (e.g., the fovea threshold). Whereas the first slope of the accumulation factor function illustrated in FIG. 4C is greater than the second slope, in various implementations, the second slope is greater than the first slope. Further, whereas the accumulation factor function illustrated in FIG. 4C has two constant linear pieces and two sloped linear pieces between the two constant linear pieces, in various implementations, the accumulation factor function has more or fewer sloped linear pieces between the two constant linear pieces.

In various implementations, the rendering module 210 of FIG. 2 generates a left rendered image to be displayed to a left eye of a user and a right rendered image to be displayed to a right eye of the user. Thus, the rendering module 210 stores a left accumulation image and a right accumulation image for blending in the periphery.

Figure 5:
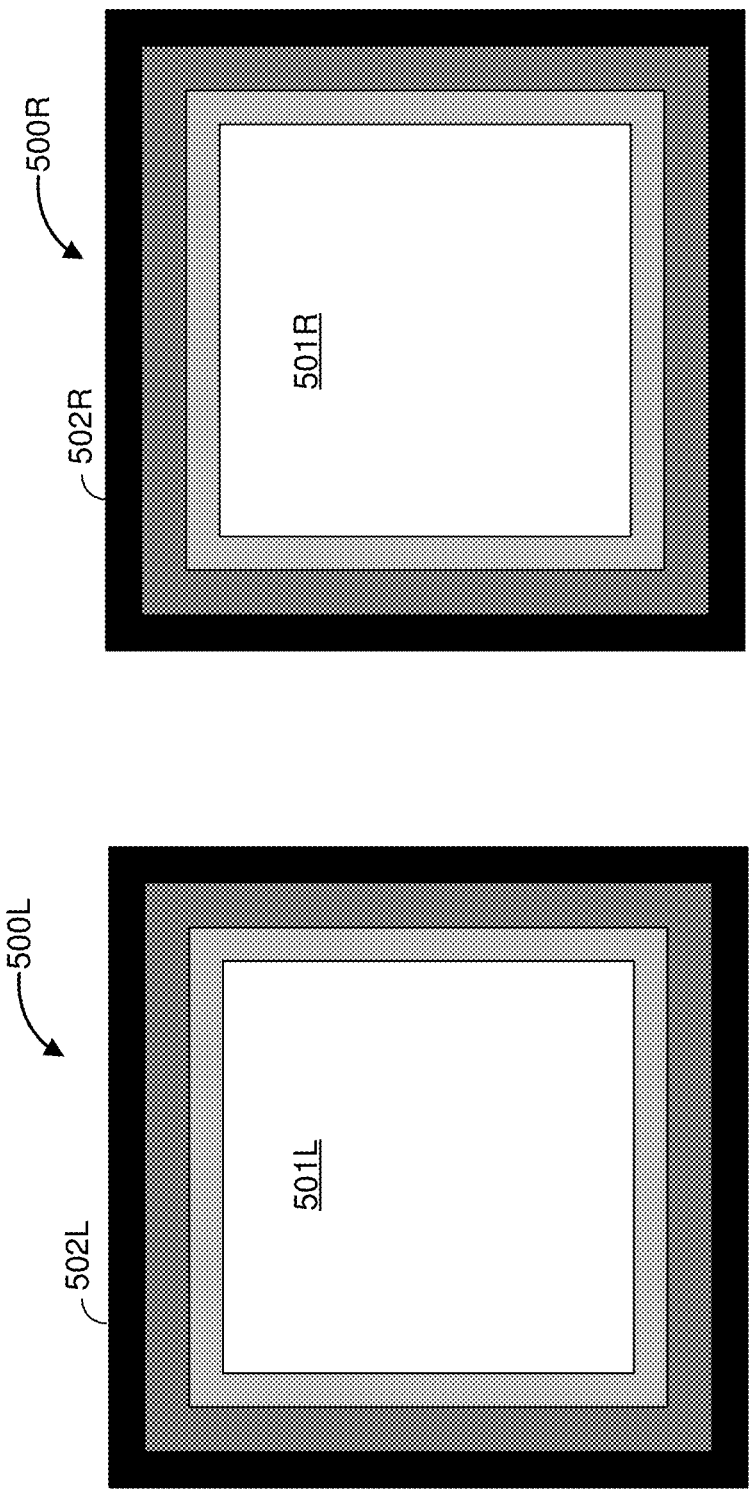

As described above, in various implementations, the accumulation region includes pixel locations for which $r_{min}(x_t,y_t)$ is less than a threshold value. FIG. 5 illustrates a left image accumulation factor map 500L and a right image accumulation factor map 500R. The left image accumulation factor map 500L includes accumulation factors for each pixel of a left currently rendered image and a left accumulation image, wherein increasing values are represented by increasing darkness. The left image accumulation factor map 500L includes a left fovea 501L including pixel locations for which the accumulation factor is 0, e.g., pixel locations for which $r_{min}(x_t,y_t)$ is greater than or equal to a threshold value, and a left accumulation region 502L including pixel locations for which the accumulation factor is greater than 0, e.g., pixel locations for which $r_{min}(x_t,y_t)$ is less than the threshold value. Similarly, the right image accumulation factor map 500R includes accumulation factors for each pixel of a right currently rendered image and right accumulation image, wherein increasing values are represented by increasing darkness. The right image accumulation factor map 500R includes a right fovea 501R including pixel locations for which the accumulation factor is 0, e.g., pixel locations for which $r_{min}(x_t,y_t)$ is greater than or equal to a threshold value and a right accumulation region 502R including pixel locations for which the accumulation factor is greater than 0, e.g., pixel locations for which $r_{min}(x_t,y_t)$ is less than the threshold value.

In various implementations, the accumulation region includes pixel locations on a right or left half of the image for which $r_{min}(x_t,y_t)$ is less than a threshold value. For example, in various implementations, the left accumulation region is limited to the left half of the left currently rendered image and left accumulation image and the right accumulation region is limited to the right half of the right currently rendered image and right accumulation image. By limiting the accumulation region to half of the image, the device consumes less power by performing fewer accumulation operations.

FIG. 6 illustrates a left image accumulation factor map 600L and a right image accumulation factor map 600R. The left image accumulation factor map 600L includes accumulation factors for each pixel of a left currently rendered image and a left accumulation image, wherein increasing values are represented by increasing darkness. The left image accumulation factor map 600L includes a left fovea 601L including pixel locations for which the accumulation factor is 0, e.g., pixel locations for which $r_{min}(x_t,y_t)$ is greater than or equal to a threshold value. The left accumulation factor map 600L includes a left accumulation region 602L including pixel locations in the left half of the left accumulation factor map 600L for which the accumulation factor is greater than 0, e.g., pixel locations on the left half of the accumulation factor map 600L for which $r_{min}(x_t,y_t)$ is less than the threshold value. Further, the left accumulation factor map 600L includes a left periphery 603L including pixels in the right half of the left accumulation factor map 600L for which the accumulation factor is 0, e.g., pixel locations in the right half of the left accumulation factor map 600L for which $r_{min}(x_t,y_t)$ is less than the threshold value.

Similarly, the right image accumulation factor map 600R includes accumulation factors for each pixel of a right currently rendered image and a right accumulation image, wherein increasing values are represented by increasing darkness. The right image accumulation factor map 600R includes a right fovea 601R including pixel locations for which the accumulation factor is 0, e.g., pixel locations for which $r_{min}(x_t,y_t)$ is greater than or equal to a threshold value. The right accumulation factor map 600R includes a right accumulation region 602R including pixel locations in the right half of the right accumulation factor map 600R for which the accumulation factor is greater than 0, e.g., pixel locations on the right half of the accumulation factor map 600R for which $r_{min}(x_t,y_t)$ is less than the threshold value. Further, the right accumulation factor map 600R includes a right periphery 603R including pixels in the left half of the right accumulation factor map 600R for which the accumulation factor is 0, e.g., pixel locations in the left half of the right accumulation factor map 600R for which $r_{min}(x_t,y_t)$ is less than the threshold value.

As noted above, in various implementations, the accumulation region includes pixel locations on a right or left half of the image for which $r_{min}(x_t,y_t)$ is less than a threshold value. As another example, in various implementations, the left accumulation region is limited to the half of the left currently rendered image the user is not looking at (e.g., is looking away from) and the right accumulation region is limited to the half of the right currently rendered image the user is not looking at.

Figure 7:
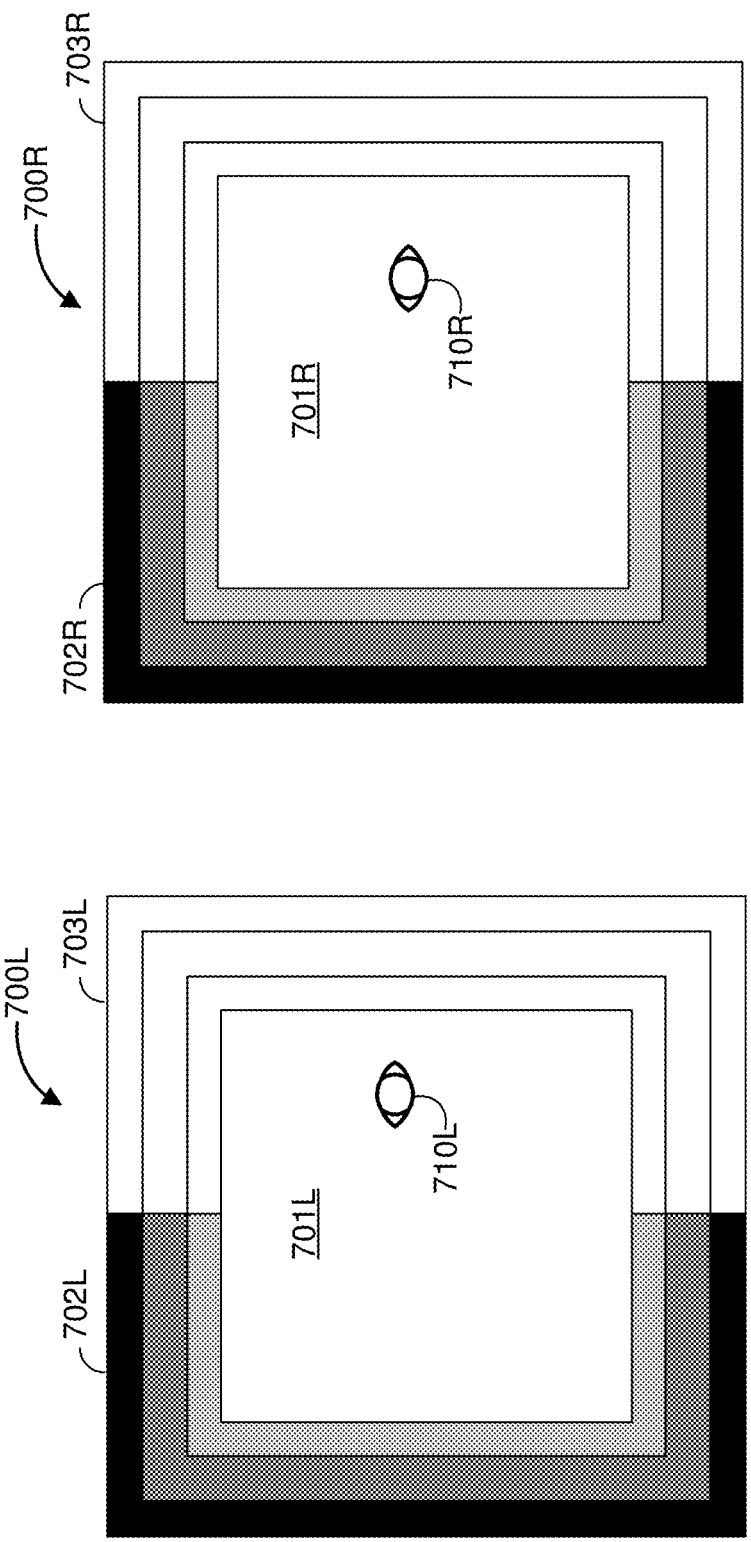

FIG. 7 illustrates a left image accumulation factor map 700L and a right image accumulation factor map 700R. FIG. 7 further illustrates a left gaze location 710L and a right gaze location 710R. In various implementations, the left gaze location 710L and right gaze location 710R are determined based on a measurement of a current gaze of a user. In various implementations, the left gaze location 710L and right gaze location 710R are determined based on one or more prior gazes of a user and/or the content displayed. The left image accumulation factor map 700L includes accumulation factors for each pixel of a left currently rendered image and a left accumulation image, wherein increasing values are represented by increasing darkness. The left image accumulation factor map 700L includes a left fovea 701L including pixel locations for which the accumulation factor is 0, e.g., pixel locations for which $r_{min}(x_t,y_t)$ is greater than or equal to a threshold value. The left accumulation factor map 700L includes a left accumulation region 702L including pixel locations in the left half of the left accumulation factor map 700L for which the accumulation factor is greater than 0, e.g., pixel locations on the opposite half of the left accumulation factor map 700L as the left gaze location 710L for which $r_{min}(x_t,y_t)$ is less than the threshold value.

Further, the left accumulation factor map 700L includes a left periphery 703L including pixels in the right half of the left accumulation factor map 700L for which the accumulation factor is 0, e.g., pixel locations in the same half of the left accumulation factor map 700L as the left gaze location 710L for which $r_{min}(x_t, y_t)$ is less than the threshold value.

Similarly, the right image accumulation factor map 700R includes accumulation factors for each pixel of a right currently rendered image and a right accumulation image, wherein increasing values are represented by increasing darkness. The right image accumulation factor map 700R includes a right fovea 701R including pixel locations for which the accumulation factor is 0, e.g., pixel locations for which $r_{min}(x_t, y_t)$ is greater than or equal to a threshold value. The right accumulation factor map 700R includes a right accumulation region 702R including pixel locations in the left half of the right accumulation factor map 700R for which the accumulation factor is greater than 0, e.g., pixel locations on the opposite half of the right accumulation factor map 700R as the right gaze location 710R for which $r_{min}(x_t, y_t)$ is less than the threshold value. Further, the right accumulation factor map 700R includes a right periphery 703R including pixels in the right half of the right accumulation factor map 700R for which the accumulation factor is 0, e.g., pixel locations in the same half of the right accumulation factor map 700R as the right gaze location 710R for which $r_{min}(x_t, y_t)$ is less than the threshold value.

FIG. 8 is a flowchart representation of generating an output image based on an accumulation image in accordance with some implementations. In various implementations, the method 800 is performed by a device with one or more processors and non-transitory memory (e.g., the electronic device 120 of FIG. 1). In some implementations, the method 800 is performed by processing logic, including hardware, firmware, software, or a combination thereof. In some implementations, the method 800 is performed by a processor executing instructions (e.g., code) stored in a non-transitory computer-readable medium (e.g., a memory).

The method 800 begins, in block 810, with the device obtaining a currently rendered image. In various implementations, the currently rendered image is a foveated image. In various implementations, the currently rendered image is a warped image.

The method 800 continues, in block 820, with the device obtaining an accumulation image based on previously rendered images. In various implementations, obtaining the accumulation image includes performing a filtering function or anti-ghosting function on a raw accumulation image based on the previously rendered images. Thus, in various implementations, the accumulation image corresponds to the blending image described above and the raw accumulation image corresponds to the accumulation image described above.

The method 800 continues, in block 830, with the device generating an output image based on the currently rendered image and the accumulation image. The output image includes a first output pixel at a first pixel location associated with a first resolution greater than or equal to a threshold. In various implementations, the first pixel location is in a fovea. In various implementations, the first resolution is the lesser of a horizontal resolution and vertical resolution of the currently rendered image at the first pixel location. The first output pixel has a first output pixel value that is a currently rendered image pixel value of a currently rendered image pixel at the first pixel location.

The output image includes a second output pixel at a second pixel location associated with a second resolution less than the threshold. In various implementations, the second pixel location is in a periphery. In various implementations, the second resolution is the lesser of a horizontal resolution and vertical resolution of the currently rendered image at the second pixel location. The second output pixel has a second output pixel value that is a weighted sum of a currently rendered image pixel value of a currently rendered image pixel at the second pixel location and an accumulation image pixel value of an accumulation image pixel at a corresponding pixel location corresponding to the second pixel location.

In various implementations, a weight of the weighted sum is based on the second resolution. For example, in various implementations, the weight of the weighted sum is based on a decreasing function of the second resolution. In various implementations, the decreasing function of the second resolution is piecewise linear.

In various implementations, the corresponding pixel location is determined based on the second pixel location and a reprojection function. In various implementations, the corresponding pixel location is determined based on a reprojection function applied to a corner of a tile including the second pixel location. In various implementations, the reprojection function is based on a resolution map including the second resolution.

The output image includes a third output pixel at a third pixel location associated with a third resolution less than the threshold. In various implementations, the third pixel location is in a periphery. In various implementations, the third resolution is the lesser of a horizontal resolution and vertical resolution of the currently rendered image at the third pixel location. The third output pixel has a third output pixel value that is a currently rendered image pixel value of a currently rendered image pixel at the third pixel location.

In various implementations, the output image is displayed (e.g., in block 840) to a left eye of a user and the third pixel location is in a right half of the output image. In various implementations, the third pixel location is in an opposite half of the output image as a gaze location of a user.

In various implementations, the method 800 further includes storing the output image as an updated accumulation image. In various implementations, the method 800 further includes generating a second output image based on a second currently rendered image and the updated accumulation image.

Figure 9:
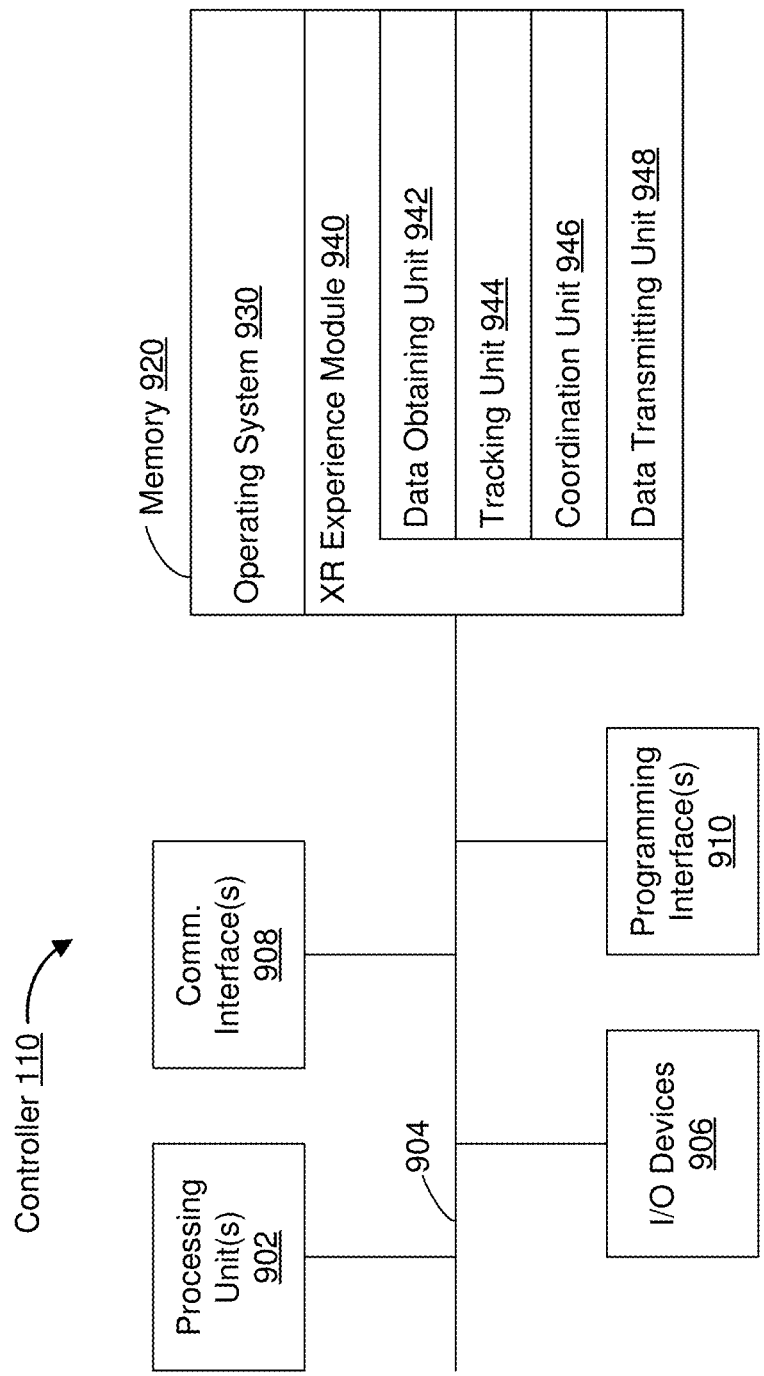
FIG. 9 is a block diagram of an example controller in accordance with some implementations.

FIG. 9 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 902 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 906, one or more communication interfaces 908 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 910, a memory 920, and one or more communication buses 904 for interconnecting these and various other components.

In some implementations, the one or more communication buses 904 include circuitry that interconnects and controls communications between system components. In some implementations, the one or more I/O devices 906 include at least one of a keyboard, a mouse, a touchpad, a joystick, one or more microphones, one or more speakers, one or more image sensors, one or more displays, and/or the like.

The memory 920 includes high-speed random-access memory, such as dynamic random-access memory (DRAM), static random-access memory (SRAM), double-data-rate random-access memory (DDR RAM), or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 comprises a non-transitory computer readable storage medium. In some implementations, the memory 920 or the non-transitory computer readable storage medium of the memory 920 stores the following programs, modules and data structures, or a subset thereof including an optional operating system 930 and an XR experience module 940.

The operating system 930 includes procedures for handling various basic system services and for performing hardware dependent tasks. In some implementations, the XR experience module 940 is configured to manage and coordinate one or more XR experiences for one or more users (e.g., a single XR experience for one or more users, or multiple XR experiences for respective groups of one or more users). To that end, in various implementations, the XR experience module 940 includes a data obtaining unit 942, a tracking unit 944, a coordination unit 946, and a data transmitting unit 948.

In some implementations, the data obtaining unit 942 is configured to obtain data (e.g., presentation data, interaction data, sensor data, location data, etc.) from at least the electronic device 120 of FIG. 1. To that end, in various implementations, the data obtaining unit 942 includes instructions and/or logic therefor, and heuristics and metadata therefor.

In some implementations, the tracking unit 944 is configured to map the physical environment 105 and to track the position/location of at least the electronic device 120 with respect to the physical environment 105 of FIG. 1. To that end, in various implementations, the tracking unit 944 includes instructions and/or logic therefor, and heuristics and metadata therefor.

In some implementations, the coordination unit 946 is configured to manage and coordinate the XR experience presented to the user by the electronic device 120. To that end, in various implementations, the coordination unit 946 includes instructions and/or logic therefor, and heuristics and metadata therefor.

In some implementations, the data transmitting unit 948 is configured to transmit data (e.g., presentation data, location data, etc.) to at least the electronic device 120. To that end, in various implementations, the data transmitting unit 948 includes instructions and/or logic therefor, and heuristics and metadata therefor.

Although the data obtaining unit 942, the tracking unit 944, the coordination unit 946, and the data transmitting unit 948 are shown as residing on a single device (e.g., the controller 110), it should be understood that in other implementations, any combination of the data obtaining unit 942, the tracking unit 944, the coordination unit 946, and the data transmitting unit 948 may be located in separate computing devices.

Moreover, FIG. 9 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 10:
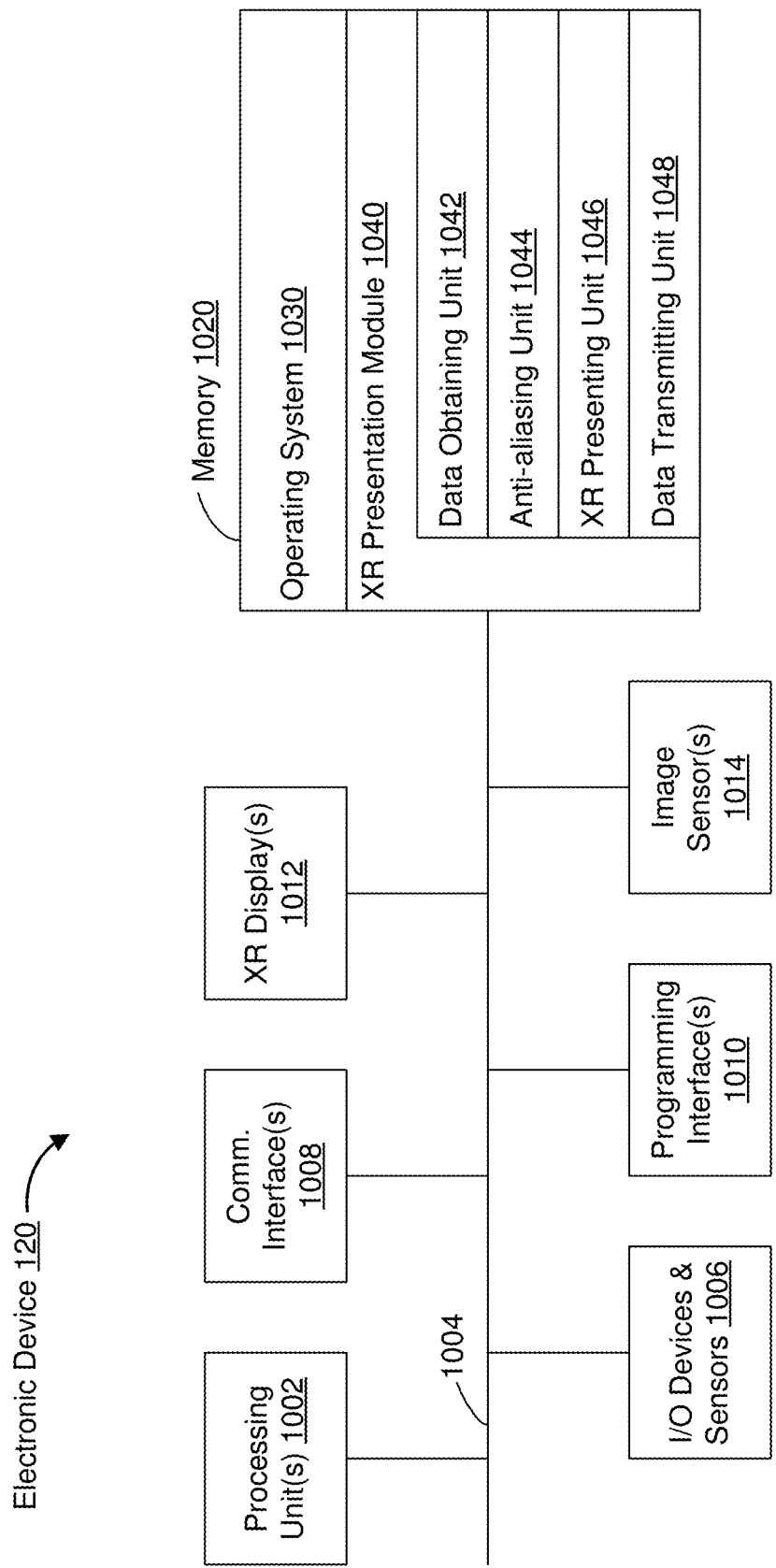
FIG. 10 is a block diagram of an example electronic device in accordance with some implementations.

FIG. 10 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 1002 (e.g., microprocessors, ASICs, FPGAs, GPUs, CPUs, processing cores, and/or the like), one or more input/output (I/O) devices and sensors 1006, one or more communication interfaces 1008 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1010, one or more XR displays 1012, one or more optional interior- and/or exterior-facing image sensors 1014, a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 1012 are configured to provide the XR experience to the user. In some implementations, the one or more XR displays 1012 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 1012 correspond to diffractive, reflective, polarized, holographic, etc. waveguide displays. For example, the electronic device 120 includes a single XR display. In another example, the electronic device includes an XR display for each eye of the user. In some implementations, the one or more XR displays 1012 are capable of presenting MR and VR content.

In some implementations, the one or more image sensors 1014 are configured to obtain image data that corresponds to at least a portion of the face of the user that includes the eyes of the user (any may be referred to as an eye-tracking camera). In some implementations, the one or more image sensors 1014 are configured to be forward-facing so as to obtain image data that corresponds to the physical environment as would be viewed by the user if the electronic device 120 was not present (and may be referred to as a scene camera). The one or more optional image sensors 1014 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium. In some implementations, the memory 1020 or the non-transitory computer readable storage medium of the memory 1020 stores the following programs, modules and data structures, or a subset thereof including an optional operating system 1030 and an XR presentation module 1040.

The operating system 1030 includes procedures for handling various basic system services and for performing hardware dependent tasks. In some implementations, the XR presentation module 1040 is configured to present XR content to the user via the one or more XR displays 1012. To that end, in various implementations, the XR presentation module 1040 includes a data obtaining unit 1042, an anti-aliasing unit 1044, an XR presenting unit 1046, and a data transmitting unit 1048.

In some implementations, the data obtaining unit 1042 is configured to obtain data (e.g., presentation data, interaction data, sensor data, location data, etc.) from at least the controller 110 of FIG. 1. To that end, in various implementations, the data obtaining unit 1042 includes instructions and/or logic therefor, and heuristics and metadata therefor.

In some implementations, the anti-aliasing unit 1044 is configured to generate an output image by blending a currently rendered image with an accumulation image to reduce temporal aliasing. To that end, in various implementations, the anti-aliasing unit 1044 includes instructions and/or logic therefor, and heuristics and metadata therefor.

In some implementations, the XR presenting unit 1046 is configured to display the output image via the one or more XR displays 1012. To that end, in various implementations, the XR presenting unit 1046 includes instructions and/or logic therefor, and heuristics and metadata therefor.

In some implementations, the data transmitting unit 1048 is configured to transmit data (e.g., presentation data, location data, etc.) to at least the controller 110. To that end, in various implementations, the data transmitting unit 1048 includes instructions and/or logic therefor, and heuristics and metadata therefor.

Although the data obtaining unit 1042, the anti-aliasing unit 1044, the XR presenting unit 1046, and the data transmitting unit 1048 are shown as residing on a single device (e.g., the electronic device 120), it should be understood that in other implementations, any combination of the data obtaining unit 1042, the anti-aliasing unit 1044, the XR presenting unit 1046, and the data transmitting unit 1048 may be located in separate computing devices.

Moreover, FIG. 10 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device having a display, one or more processors, and non-transitory memory;
obtaining a currently rendered image;
obtaining an accumulation image based on previously rendered images;
generating an output image based on the currently rendered image and the accumulation image, wherein the output image includes:
  a first output pixel at a first pixel location associated with a first resolution greater than or equal to a threshold, the first output pixel having a first output pixel value that is a currently rendered image pixel value of a currently rendered image pixel at the first pixel location;
  a second output pixel at a second pixel location associated with a second resolution less than the threshold, the second output pixel having a second output pixel value that is a weighted sum of a currently rendered image pixel value of a currently rendered image pixel at the second pixel location and an accumulation image pixel value of an accumulation image pixel at a corresponding pixel location corresponding to the second pixel location; and
  a third output pixel at a third pixel location associated with a third resolution less than the threshold, the third output pixel having a third output pixel value that is a currently rendered image pixel value of a currently rendered image pixel at the third pixel location; and
displaying, on the display, the output image.

2. The method of claim 1, wherein the currently rendered image is a warped image.

3. The method of claim 1, wherein obtaining the accumulation image includes performing a filtering function or anti-ghosting function on a raw accumulation image based on the previously rendered images.

4. The method of claim 1, wherein the first pixel location is in a fovea, the second pixel location is in a periphery, and the third pixel location is in the periphery.

5. The method of claim 4, wherein the output image is displayed to a left eye of a user and the third pixel location is in a right half of the output image.

6. The method of claim 4, wherein the third pixel location is in an opposite half of the output image as a gaze location of a user.

7. The method of claim 1, wherein the second resolution is the lesser of a horizontal resolution and a vertical resolution of the currently rendered image at the second pixel location.

8. The method of claim 1, wherein a weight of the weighted sum is based on the second resolution.

9. The method of claim 8, wherein the weight of the weighted sum is based on a decreasing function of the second resolution.

10. The method of claim 9, wherein the decreasing function of the second resolution is piecewise linear.

11. The method of claim 1, wherein the corresponding pixel location is determined based on the second pixel location and a reprojection function.

12. The method of claim 11, wherein the corresponding pixel location is determined based on a reprojection function applied to a corner of a tile including the second pixel location.

13. The method of claim 11, wherein the reprojection function is based on a resolution map including the second resolution.

14. The method of claim 1, further comprising storing the output image as an updated accumulation image.

15. The method of claim 14, further comprising generating a second output image based on a second currently rendered image and the updated accumulation image.

16. A device comprising:
a non-transitory memory; and
one or more processors to:
  obtain a currently rendered image;
  obtain an accumulation image based on previously rendered images;
  generate an output image based on the currently rendered image and the accumulation image, wherein the output image includes:
    a first output pixel at a first pixel location associated with a first resolution greater than or equal to a threshold, the first output pixel having a first output pixel value that is a currently rendered image pixel value of a currently rendered image pixel at the first pixel location;
    a second output pixel at a second pixel location associated with a second resolution less than the threshold, the second output pixel having a second output pixel value that is a weighted sum of a currently rendered image pixel value of a currently rendered image pixel at the second pixel location and an accumulation image pixel value of an accumulation image pixel at a corresponding pixel location corresponding to the second pixel location; and
    a third output pixel at a third pixel location associated with a third resolution less than the threshold, the third output pixel having a third output pixel value that is a currently rendered image pixel value of a currently rendered image pixel at the third pixel location; and
  display, on the display, the output image.

17. The device of claim 16, wherein the first pixel location is in a fovea, the second pixel location is in a periphery, and the third pixel location is in the periphery.

18. The device of claim 17, wherein the output image is displayed to a left eye of a user and the third pixel location is in a right half of the output image.

19. The device of claim 17, wherein the third pixel location is in an opposite half of the output image as a gaze location of a user.

20. A non-transitory memory storing one or more programs, which, when executed by one or more processors of a device, cause the device to:

obtain a currently rendered image;
obtain an accumulation image based on previously rendered images;
generate an output image based on the currently rendered image and the accumulation image, wherein the output image includes:
  a first output pixel at a first pixel location associated with a first resolution greater than or equal to a threshold, the first output pixel having a first output pixel value that is a currently rendered image pixel value of a currently rendered image pixel at the first pixel location;
  a second output pixel at a second pixel location associated with a second resolution less than the threshold, the second output pixel having a second output pixel value that is a weighted sum of a currently rendered image pixel value of a currently rendered image pixel at the second pixel location and an accumulation image pixel value of an accumulation image pixel at a corresponding pixel location corresponding to the second pixel location; and
  a third output pixel at a third pixel location associated with a third resolution less than the threshold, the third output pixel having a third output pixel value that is a currently rendered image pixel value of a currently rendered image pixel at the third pixel location; and
display, on the display, the output image.

* * * * *